May 30, 1933. H. S. ASHMUN 1,911,598
DEVICE AND METHOD OF FORMING TAPERED THREAD ON PIPES
Filed April 5, 1930  3 Sheets-Sheet 1
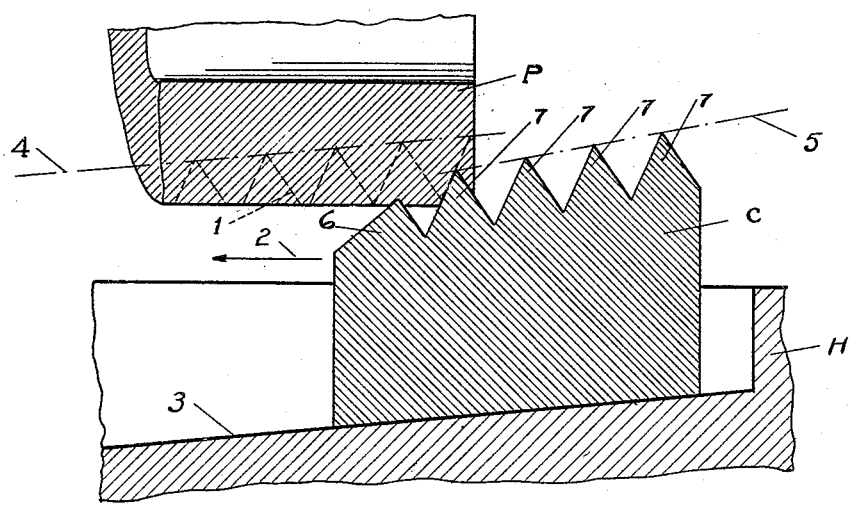
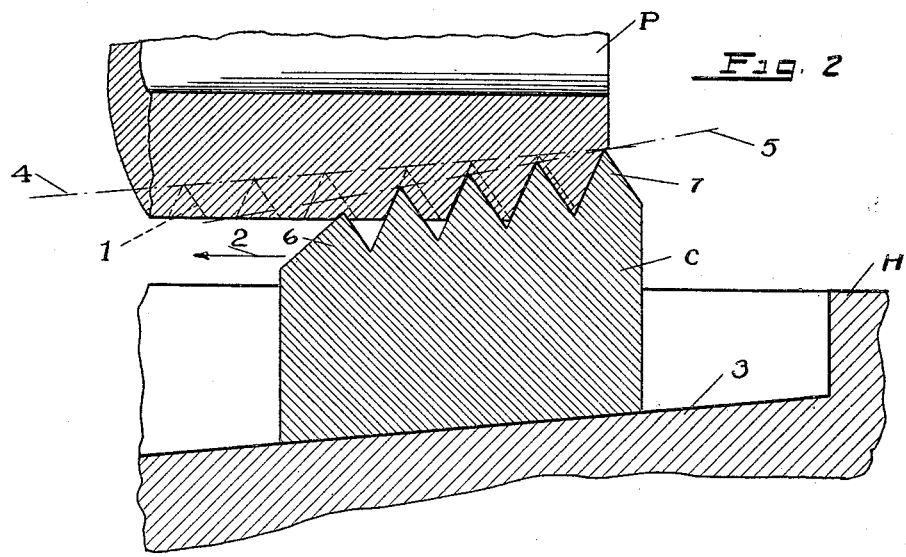
INVENTOR
Harry S Ashmun
BY
Mock & Blum
ATTORNEYS

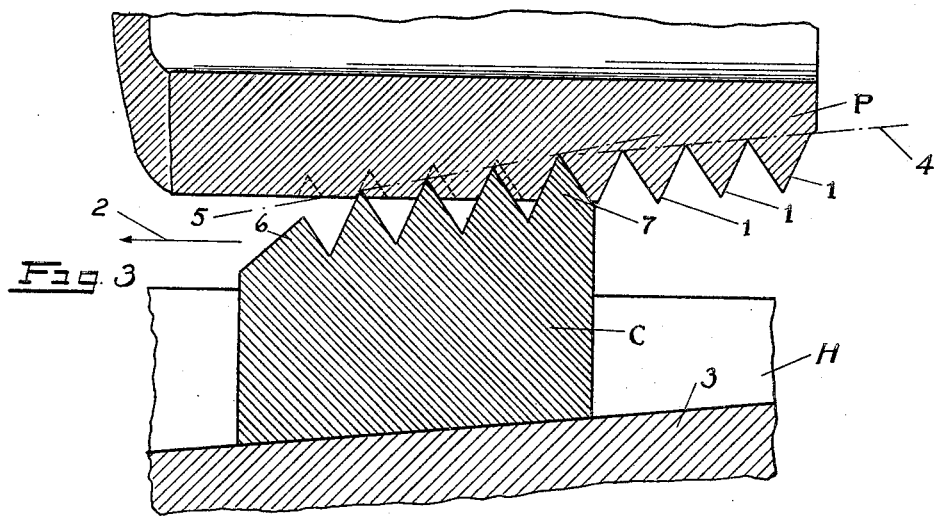
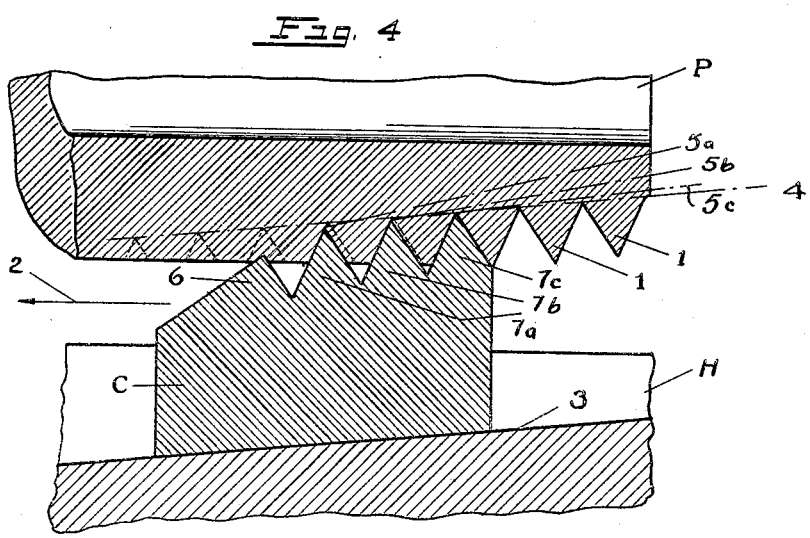

May 30, 1933.  H. S. ASHMUN  1,911,598
DEVICE AND METHOD OF FORMING TAPERED THREAD ON PIPES
Filed April 5, 1930  3 Sheets-Sheet 3

Patented May 30, 1933

1,911,598

UNITED STATES PATENT OFFICE

HARRY S. ASHMUN, OF NEW YORK, N. Y., ASSIGNOR TO THE ARMSTRONG MANUFACTURING CO., OF NEW YORK, N. Y., A CORPORATION OF CONNECTICUT

DEVICE AND METHOD OF FORMING TAPERED THREAD ON PIPES

Application filed April 5, 1930. Serial No. 441,740.

My invention relates to a new and improved pipe threading device and to a new and improved method of forming a tapered thread in a pipe.

One of the objects of my invention is to provide a pipe threading device having chasers of a new and improved type.

Another object of my invention is to provide an improved pipe threading device for cutting tapered screw threads.

It is to be understood that the invention applies to cutting threads upon any object, such as solid rods, for example.

Another object of my invention is to provide a device for threading pipes, tubes, rods or the like, in which the chasers are caused to turn and to move longitudinally along the pipe or the like, the chasers being also caused to simultaneously move laterally.

Other objects of my invention will be set forth in the following description and drawings which illustrate preferred embodiments thereof, it being understood that the above general statement of the objects of my invention is intended merely to generally explain the same and not to limit it in any manner.

Fig. 1 is a diagrammatic sectional view showing the operation of the improved chaser, at the commencement of the formation of the thread.

Fig. 2 is a view similar to Fig. 1 showing all the teeth of a chaser in action.

Fig. 3 shows the continuation of the operation illustrated in Figs. 1 and 2.

Fig. 4 shows a different embodiment.

Figure 5:
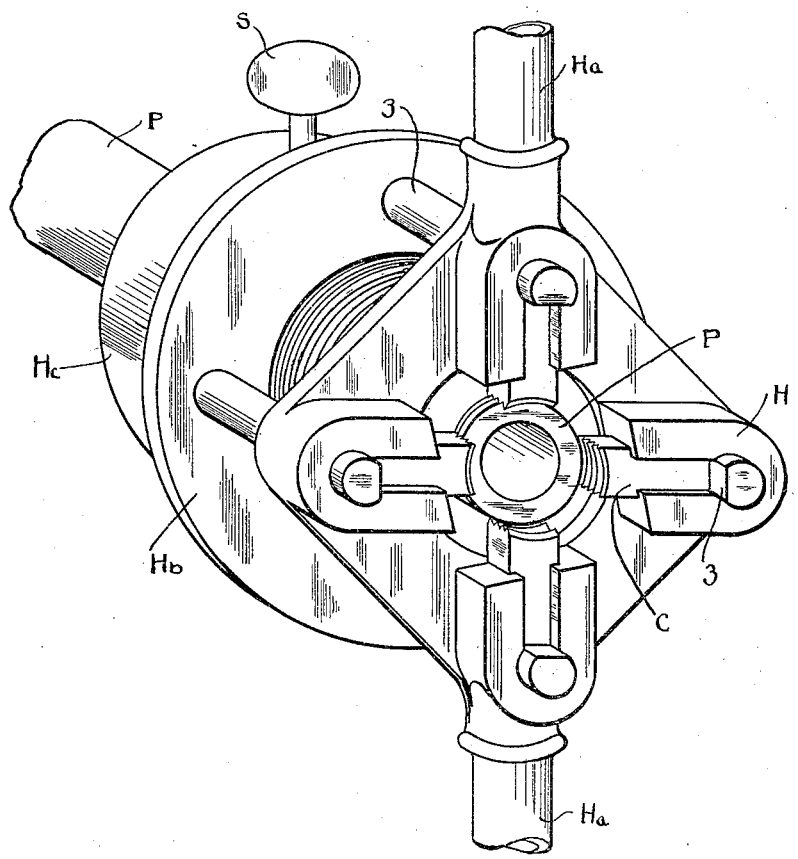

Fig. 5 diagrammatically illustrates the holder for manipulating the chasers.

Heretofore two methods have been utilized for producing tapered screw threads on pipes, tubes, or rods, by means of screw dies or chasers. According to one method, the device known as a "pipe die" was utilized. This pipe die had a number of full cutting teeth, which number was the same as the number of screw threads to be formed on the pipe, or the like. When this device was used, each cutting tooth removed the same relative amount of metal or other material from the pipe, so that more force was necessary to operate the device, as more teeth went into action.

According to another method, the number of teeth on each chaser was smaller than the number of threads to be formed on the pipe, or the like. Each chaser was turned upon the pipe, and it was also moved longitudinally along the pipe, and it was also caused to move laterally away from the surface on which the thread was being cut, by means of a cam surface or other regulating means. According to this method, each tooth had the same angle, which corresponded to the taper of the screw thread to be cut, so that the cutting tooth posterior to the first cutting tooth did not perform any substantial work.

Referring to Fig. 1, the tapered thread to be cut in the pipe P is indicated by the dotted lines 1, and the taper of said thread is indicated by the line 4.

For convenience, it may be assumed that the line 4 has the normal taper of one to sixteen to the central longitudinal axis of the pipe P.

The chaser C is mounted in a holder H of any suitable type, and the base of the chaser C makes sliding contact with a surface 3, whose inclination to the central longitudinal axis of the pipe is the same as that of the inclination of the line 4.

The chaser C is provided with a roughing tooth 6 (or a plurality of such roughing teeth), and with a succession of thread cutting teeth 7. These teeth 7 may be defined and designated as "finishing teeth" in order to distinguish them from the roughing or entering teeth. The tips of the cutting teeth 7 are defined by the line 5, and it will be noted that the inclination of the line 5 is greater than the inclination of the lines 3 and 4. In this embodiment, the inclination of the line 5 is twice that of the line 4, that is, one to eight.

When the chasers C operate, the first tooth 6 of each of them makes a roughing cut. The succeeding thread-forming teeth 7 then continue the cut so that each portion or turn of the thread is completely formed by four of these teeth 7.

I do not wish to be restricted to any particular number of roughing teeth or of thread-forming teeth.

It is clearly shown in Figs. 1 and 2 how each of the thread-forming teeth 7 forms a portion of the thread, so that each turn or winding of the thread is gradually shaped, until it has been completely shaped by the action of the four (or other desired number) thread-forming teeth 7. It is assumed that the chasers C also move in a direction defined by the arrow 2.

Fig. 3 shows the completely formed windings 1 of the thread which has been formed in the pipe P, and it also shows the formation of additional turns of the thread.

In the embodiment shown in Fig. 4, each of the chasers C still has an initial tooth 6 for forming the roughing cut. In this embodiment, each chaser C is provided with thread-cutting teeth 7a, 7b, and 7c which have different inclinations to the axis of the pipe, these different inclinations being respectively defined by the lines 5a, 5b, and 5c. In this embodiment only three thread-forming teeth 7a, 7b and 7c are illustrated, as the initial or roughing tooth 6 may be disregarded.

It is well known to form these chasers by means of milling tools. Each of the thread-cutting teeth may be theoretically assumed as having been formed by a milling tool whose cross-section is an isosceles triangle, whose base is kept horizontal, with its vertex pointing downwards. The blank upon which this tool is caused to operate is formed from a block having a rectangular cross-section. Assuming that this block is placed upon a horizontal base, the top face of said block is cut so as to have the desired taper, namely, one to eight. In making the embodiment shown in Figs. 1-3, the milling tool is caused to operate upon this inclined face, so as to form the teeth 7, said milling tool being caused to operate at an angle to the axis of the blank, so that the teeth 7 are inclined to produce a thread of the desired pitch. However, the base of the milling tool which is utilized to form the teeth 7, is always kept horizontal.

In forming the embodiment shown in Fig. 4, the method of operation is essentially the same save that the varying angles shown in Fig. 4 are produced. That is, if a line is drawn connecting the bases of the teeth 7 shown in Figs. 1-3, said line would be parallel to the line 5.

In the embodiment shown in Fig. 4, the lines 5a, 5b and 5c are parallel to the base lines of their respective cutting teeth 7a, 7b and 7c.

The formation of each turn of the tapered thread follows lathe practice, in that a deep or roughing cut is first formed, and the thread is then completed by a plurality of succeeding cuts, which become finer and finer.

The action is the same, as in both embodiments in that each turn of the thread which is formed upon the pipe or rod is partially formed by each tooth of the series, the last tooth of the series accomplishing the last or finishing operation.

The direction line defined by the arrow 2 is parallel to the axis of the pipe P.

Fig. 5 shows a type of device in which the improved chasers can be located and operated as previously specified.

The device comprises a collar Hc which is adapted to be clamped adjacent the end of the pipe P, by means of a plurality of clamping screws S, one of which is shown in Fig. 5. The collar Hc has a forwardly projecting externally threaded end or it may be provided with an internally threaded nut. A ring Hb is located in a groove of the collar Hc, so that the ring Hb can freely turn, without being permitted to move longitudinally.

The ring Hb is provided with forwardly projecting cam members 3, whose adjacent surfaces have the inclinations previously specified. The holder H has the chasers C slidably located therein, so that the chasers C can slide laterally, the inner end of said chasers abutting the cam surfaces as previously specified. The holder H has an externally threaded portion which cooperates with the internally threaded nut of the collar Hc.

Hence, when the collar H is turned by means of the handles Ha, it is caused to move longitudinally, together with the chasers C so that a tapered thread is formed at the end of pipe P, in the manner previously described.

It will be noted that the number of threads which are formed, exceeds the number of cutting members or cutting surfaces utilized. In other words, the length of the thread is not dependent upon the length of the chaser.

It will also be noted that while the cutting surfaces are being turned in order to produce the thread, said cutting surfaces are also moved both laterally and longitudinally with respect to the axis of the pipe, so that the composite movement of said cutting surfaces is along a line which is parallel to the base of the tapered thread which is being formed. Likewise, said cutting surfaces are located upon a line whose inclination with respect to the axis of the pipe exceeds the inclination of the base of the thread which is being formed.

Hence, and as shown in Fig. 2, the pieces of material which are successively removed from the periphery of the body, in order to form the tapered thread, are located along a line whose inclination with respect to the longitudinal axis of said body, exceeds the inclination of the base of the thread.

For the purposes of this description each chaser C may be defined as having a longitudinal axis which is parallel to the longitudinal axis of the pipe or the like. The base of each chaser is inclined to the longitudinal axis thereof, and the inclination of the cutting teeth exceeds the inclination of said base.

I have shown a preferred embodiment of my invention, but it is clear that numerous changes and omissions can be made without departing from its spirit.

I claim:

1. A method of finishing the tapered outer thread in a body which consists in removing the material for forming each turn of said thread from the periphery of said body in a series of successive portions, in order to fully shape said tapered thread, said successive portions being removed along a line whose inclination to the axis of said body exceeds the inclination of the thread.

2. A method of finishing the tapered outer thread in a body which consists in forming said thread by means of a series of cutting teeth which are more sharply inclined to the axis of said body, than said thread, said cutting teeth being turned and being also moved longitudinally and laterally with respect to the axis of the body in order to form said thread, the lateral movement of said cutting teeth being along a line which is substantially parallel to the base of said thread.

3. A method of finishing the tapered outer thread in a body, which consists in cutting the material of said body thereof in a plurality of steps in order to form said thread, the quantity of material removed in each step being less than the quantity removed in the preceding step or steps; said successive portions being removed along a line whose inclination to the axis of said body exceeds the inclination of the thread.

4. For use in cutting a tapered thread in a body, a chaser having a plurality of cutting teeth, said teeth having an inclination to the axis of said body, which exceeds the inclination of the tapered thread to be formed to said axis, the base of said chaser being inclined to the longitudinal axis thereof, the inclination of said base to said longitudinal axis being less than the inclination of said cutting teeth to said longitudinal axis.

5. In combination, a holder adapted to hold a plurality of chasers, said holder having means adapted to control the movement of each of said chasers along a line inclined to the central longitudinal axis of the holder, said chasers each having a succession of thread-cutting teeth whose inclinations to said axis exceed the line defining the movement of said chasers laterally with respect to said axis.

6. In combination, a holder adapted to hold a plurality of chasers, said holder having means adapted to control the movement of each of said chasers along a line inclined to the central longitudinal axis of the holder, said chasers each having a succession of thread-cutting teeth whose inclinations to said axis exceed the line defining the movement of said chasers laterally with respect to said axis, each cutting tooth having an inclination to the axis of said holder which is less than the inclination of the preceding tooth or teeth.

7. For use in cutting a tapered thread in a body, a chaser having a plurality of finishing thread-cutting teeth, said finishing teeth having an inclination to the axis of said body, which exceeds the inclination of the tapered thread to be formed to said axis, said finishing cutting teeth being substantially identical in size and shape.

8. In combination, a holder adapted to hold a plurality of chasers, said holder having means adapted to control the movement of each of said chasers along a line inclined to the central longitudinal axis of the holder, said chasers each having a succession of thread-cutting teeth whose inclinations to said axis exceed the line defining the movement of said chasers laterally with respect to said axis, said thread-cutting teeth being substantially identical in size and shape.

In testimony whereof I affix my signature.

HARRY S. ASHMUN.